United States Patent [19]
Hahn

[11] Patent Number: 5,788,745
[45] Date of Patent: Aug. 4, 1998

[54] PROCESS AND APPARATUS FOR VAPOR RECOVERY

[75] Inventor: Paul R. Hahn, Midland, Tex.

[73] Assignee: Phillips Petroleum Company, Bartlesville, Okla.

[21] Appl. No.: 485,523

[22] Filed: Jun. 7, 1995

[51] Int. Cl.$^6$ .................... B01D 53/14; B01D 3/00
[52] U.S. Cl. ............... 95/231; 95/193; 203/14; 203/18; 203/42
[58] Field of Search ............. 95/231, 193, 192; 55/228, 229; 203/14, 18, 98, 100, 42; 202/183–184; 159/DIG. 40

[56] References Cited

U.S. PATENT DOCUMENTS

| | | | |
|---|---|---|---|
| 2,990,910 | 7/1961 | Kimmell | 95/231 |
| 3,648,434 | 3/1972 | Gravis, III et al. | 95/231 |
| 3,736,725 | 6/1973 | Alleman et al. | 55/32 |
| 4,066,423 | 1/1978 | McGill et al. | 95/103 |
| 4,322,265 | 3/1982 | Wood | 159/47 R |
| 4,427,420 | 1/1984 | Reid | 95/192 |
| 4,659,344 | 4/1987 | Gerlach et al. | 95/231 |
| 4,676,806 | 6/1987 | Dean et al. | 95/231 |
| 4,689,053 | 8/1987 | Heath | 55/20 |
| 4,715,868 | 12/1987 | Kennedy | 96/126 |
| 4,948,394 | 8/1990 | Rojey | 55/228 |
| 5,048,200 | 9/1991 | Ryham | 34/32 |
| 5,084,074 | 1/1992 | Beer et al. | 55/20 |
| 5,141,536 | 8/1992 | Schievelbein et al. | 55/208 |
| 5,163,981 | 11/1992 | Choi | 55/32 |
| 5,209,762 | 5/1993 | Lowell | 55/31 |
| 5,221,523 | 6/1993 | Miles et al. | 422/182 |
| 5,469,705 | 11/1995 | Glenn, Jr. | 60/693 |
| 5,492,556 | 2/1996 | Garrett | 95/193 |
| 5,520,723 | 5/1996 | Jones, Jr. | 95/231 |

OTHER PUBLICATIONS

True, W.R., *Oil & Gas Journal*, "Federal, state efforts force reexamination of glycol–reboiler emission", May 17, 1993, pp. 28–32 and 49.

Schievelbein, V.H., Gas Research Institute Glycol Dehydrator Air Emissions conference, New Orleans, LA, "Texaco's Dehydrator Air Emissions", Jul. 20–22, 1992.

Schievelbein, V.H., SPE/EPA Exploration & Production Environmental Conference held in San Antonio, Texas, "Hydrocarbon Recovery From Glycol Reboiler Vapor With Glycol–Cooled Condensers", SPE Paper 25949, Mar. 7–10, 1993.

Daniels, R. et al, Gas Research Institute Glycol Dehydrator Air Emissions conference, New Orleans, LA, "Hydrogen Removal From Glycol Dehydrator Vent Gas", Jul. 20–22, 1992, pp. 279–280.

*Primary Examiner*—Virginia Manoharan
*Attorney, Agent, or Firm*—Richmond, Hitchcock, Fish & Dollar

[57] ABSTRACT

A process for purifying a raw natural gas stream is provided by contacting the gas stream with an absorbant to remove water and hydrocarbon impurities, separating the water and hydrocarbon impurities and absorbant from the gas stream, separating the absorbant from the water and hydrocarbon impurities to provide a liquid absorbant stream and a water vapor and hydrocarbon vapor stream, condensing the water vapor and a portion of the hydrocarbon vapor stream to provide a mixed liquid/vapor stream, passing the mixed stream through a pump capable of pumping a mixed stream, and disposing of the thus-reduced volume, higher pressure, mixed stream. One aspect of the invention provides for the reintroduction of the mixed stream to the process with the raw natural gas, thereby eliminating volatile organic compound disposal concerns.

5 Claims, 4 Drawing Sheets

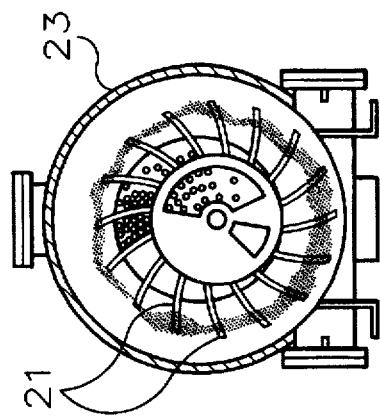
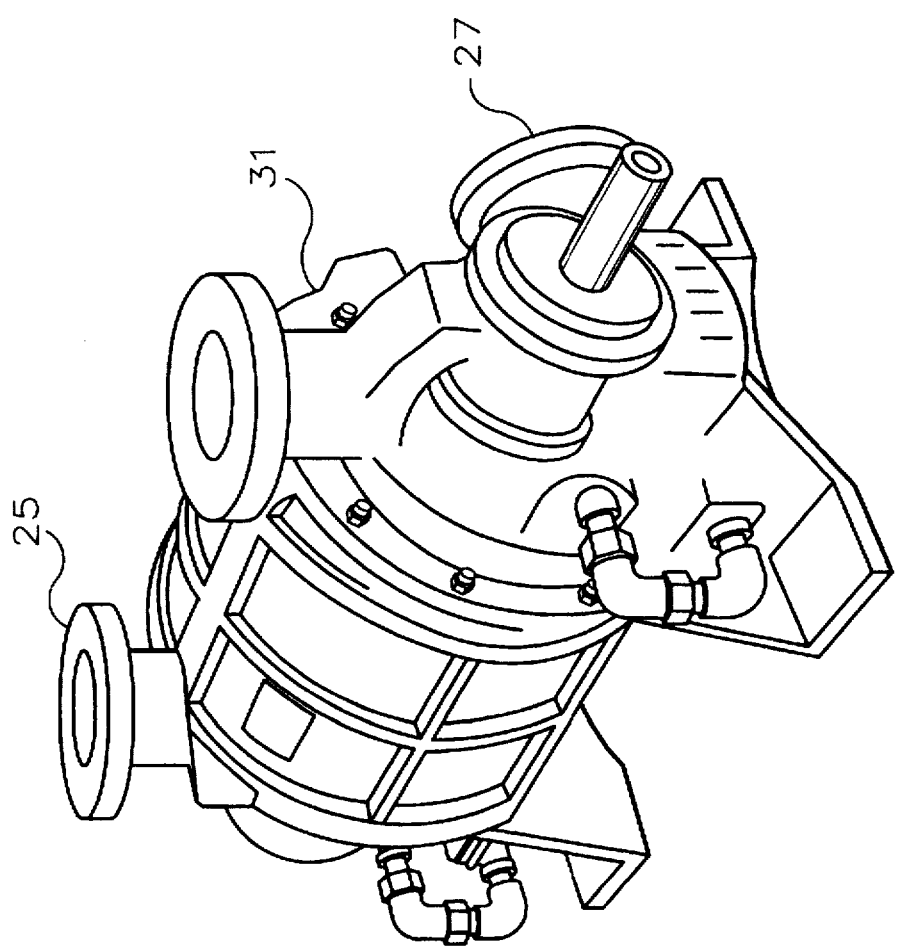
FIG. 4
FIG. 4a
FIG. 4b 5,788,745

1

PROCESS AND APPARATUS FOR VAPOR RECOVERY

BACKGROUND OF THE INVENTION

This invention relates to a process for purifying natural gas. In another aspect, this invention relates to an improvement in the process for regenerating the absorbent used to purify natural gas. In yet another aspect, this invention relates to a method of purifying natural gas whereby the emission of volatile organic compounds is essentially eliminated.

Processing of natural gas is required in order to provide uniformly lean, sweet and dry gas for consumer use. Such processing typically involves a number of different processes designed to remove various components and impurities from the raw gas. Impurities can include acid gases such as carbon dioxide, hydrogen sulfide and carbonyl sulfide, and other sulfur compounds. Other components that are removed include alkanes higher than methane which can be sold for greater value than the natural gas. Any water or water vapor must also be removed.

While water or water vapor can be removed by several methods, a widely used method of removal involves the use of a desiccant or absorbent material or compound to absorb the water. Commonly used absorbents include glycols such as ethylene glycol, diethylene glycol and triethylene glycol, due to relatively low cost of the absorbents, ease of operation and regeneration, and minimal losses of absorbent during the gas dehydration process.

Glycol dehydration units typically consist of a vessel in which the glycol and wet gas are contacted and dry gas is separated from glycol containing water and a glycol regenerator containing a reboiler to remove the water from the glycol by vaporizing the water, along with any attendant pumps and separation vessels which operate to separate and convey the various liquid and vapor streams.

It is recognized that the water vapor that exits the reboiler contains volatile organic compounds, including benzene, toluene, ethylbenzene and xylene. Rather than venting such volatile organic compounds with the water vapor to the atmosphere, various schemes have evolved whereby such compounds are condensed from the water vapor vent line and recovered, or are directly incinerated. Such schemes are costly and often do not eliminate or reduce volatile organic compounds to acceptable levels.

It would be desirable to have a method for recovering volatile organic compounds during the regeneration of the glycol which does not necessitate the use of additional, expensive equipment and processes.

SUMMARY OF THE INVENTION

An object of this invention is to provide an improved process for recovering absorbent during a natural gas purification process. Another object of this invention is to provide a method for eliminating the emissions of volatile organic compounds during the regeneration of absorbent in a natural gas purification process.

In accordance with this invention, a process is provided for purifying a raw natural gas stream containing water and hydrocarbon impurities by contacting the raw natural gas stream with an absorbent to absorb water; which also incidentally absorbs certain hydrocarbon components of the gas stream; separating the absorbent, water and absorbed hydrocarbon components from the purified gas stream; separating the absorbent from the water and absorbed hydrocarbon components by vaporizing the water and hydrocarbon components; partially condensing the vapor stream and conveying the partially condensed stream using a pump equipped to handle a two-phase liquid-vapor stream, optionally thereafter separating the liquid, mainly water, and vapor, mainly volatile hydrocarbon compounds, portions of the stream. In one embodiment of this invention, the mixed liquid and vapor outlet stream from the pump is recycled to the raw gas inlet for processing.

BRIEF DESCRIPTION OF THE DRAWINGS

FIG. 4 illustrates a liquid-ring pump which has been advantageously employed in the process of this invention. FIG. 4 contains FIGS. 4a and 4b. FIG. 4a illustrates a perspective view of the liquid-ring pump. FIG. 4b illustrates a sectional view of the liquid-ring pump.

DETAILED DESCRIPTION

Figure 1:
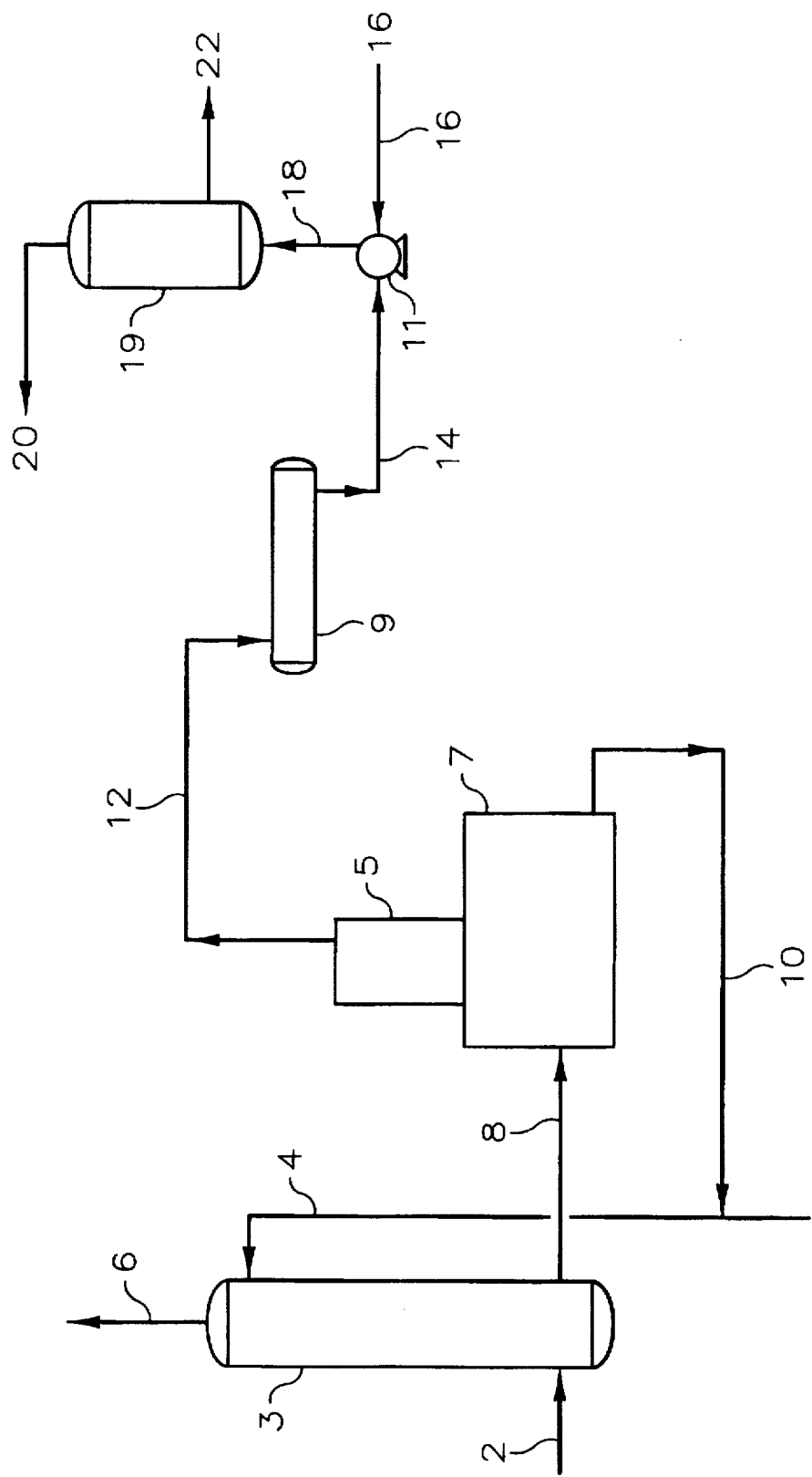
FIG. 1 is a schematic flow diagram for a typical natural gas dehydration system with the apparatus of this invention installed therein.

Referring to FIG. 1, a natural gas feedstream 2 is passed through an absorber 3 which has an absorbent stream 4 passing therethrough. The absorbent stream comprises an absorbent useful for removing water from the natural gas stream. The absorbent may incidentally remove a small portion of certain hydrocarbon components from the gas stream, e.g. a minor amount of methane, ethane and higher alkanes. It is preferred to use a glycol as the absorbent due to cost, availability, and ease of operation and regeneration. Examples of glycols that are useful as absorbents include, but are not limited to, ethylene glycol, diethylene glycol, and triethylene glycol. It is presently preferred in this invention to use triethylene glycol as the absorbent.

While natural gas stream 2 and absorbent stream 4 can contact each other in any manner, it is preferred to provide for entry of stream 2 and stream 4 from opposite ends of the absorber to provide countercurrant contacting flow of the two streams. During such contact, stream 4 removes a substantial amount of the water and a small amount of hydrocarbon components from the natural gas which exits via line 6. The absorbent with associated water and hydrocarbon components discharge from absorber 3 via line 8 into the regenerator stripping column 5, having associated therewith reboiler 7. In column 5 and reboiler 7, the water and hydrocarbon impurities are separated from the absorbent, with the absorbent returned to the absorber 3 through line 10. The water, predominantly in vapor form, and hydrocarbon components discharge from column 5 through overhead line 12 and flow into a condenser 9 wherein the water and a portion of the hydrocarbon components are condensed. The exit stream 14 from the condenser consists of mixed vapor and liquid and is conveyed by pump 11 which, by its operation, is capable of handling a mixed liquid-vapor stream and accomplishes an increase in pressure of the vapor portion of the mixed stream and optionally, condenses an additional amount of condensible hydrocarbons. Pump 11 employs, if necessary, a liquid service stream 16 and produces a mixed liquid vapor outlet stream 18. The condensed water and condensed hydrocarbons and service liquid exit pump 11 with the non-condensible hydrocarbon vapors through stream 18. In a preferred embodiment of this invention, stream 18 is passed to a separator 19 to separate the vapor portion 20 of stream 18 from the liquid portion 22 of stream 18. The vapor portion 20 is returned to the natural gas feedstream 2 for processing with the raw natural gas.

Figure 2:
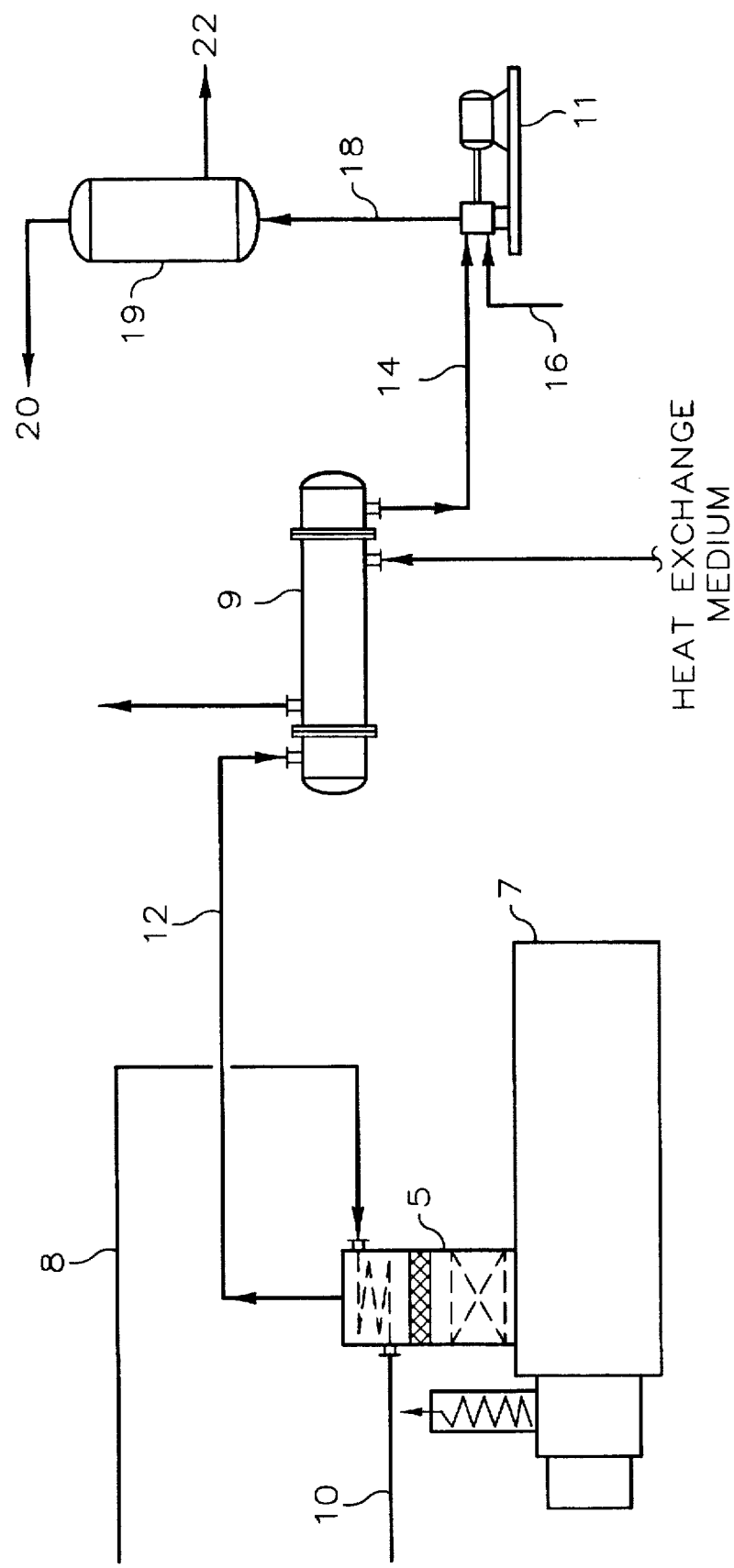
FIG. 2 illustrates the absorbent recovery system portion of the process.
Figure 3:
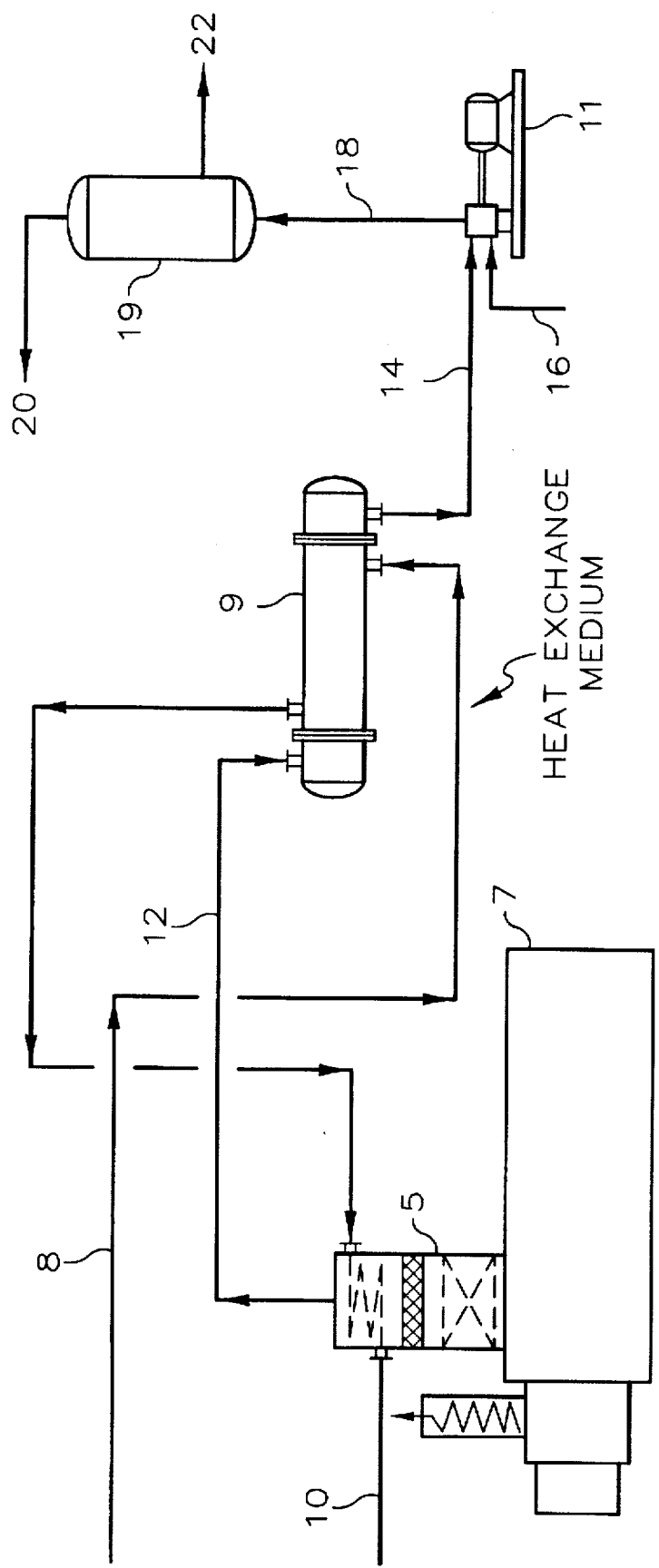
FIG. 3 illustrates a preferred mode of operation for the absorbent recovery system portion of the process.

FIG. 2 illustrates the absorbent regeneration section of the natural gas processing system in more detail. The overhead vapor stream 12 from a conventional glycol regenerator stripping column 5 is passed to a condenser 9 at a temperature which is typically in the range of about 190° to about 215° F. and a pressure which is typically in the range of about 2 psig below atmospheric pressure to about 2 psig above atmospheric pressure. The condenser can be any condenser capable of liquefying substantially all of the water vapor and a portion of the hydrocarbon components. It is presently preferred to use as the condenser a heat exchanger employing a heat exchange medium to cool the vapor stream to a mixed stream 14 of water and condensed hydrocarbons and non-condensible hydrocarbon vapors. In an especially preferred embodiment of this invention, the glycol that leaves the absorber 3 is employed as the heat exchange medium, thereby warming the glycol from the absorber prior to its delivery to the regenerator, see FIG. 3. The mixed liquid-vapor stream 14 feeds into pump 11 which accomplishes a reduction in volume and increase in pressure of the vapor portion of the outlet stream 18, and optionally condenses an additional amount of condensible hydrocarbons, obviating the need for additional equipment to achieve the separation of liquid and vapor prior to increasing the vapor to the desired pressure. The reduction of volume of the vapor also allows for the reduction in size of downstream equipment and piping, thereby reducing cost.

If preferred, mixed stream 18 can be subjected to a separation process in order to remove the vapor portion of stream 18 from the liquid portion 22, which can be disposed of by any suitable means, such as with the waste water of the plant. Condensed hydrocarbons can optionally be further separated from the water, collected and disposed of or sold as fuel, crude oil blend, etc. The vapor portion 20 of the stream 18 can be disposed of, for example, by incinerating it or by returning it to the raw natural gas inlet for processing. (See FIGS. 1–3).

It has been discovered that a liquid-ring pump is particularly well suited to achieve the desired reduction of volume and increase in pressure of the vapor portion of the mixed stream. FIG. 4 illustrates a liquid-ring pump suitable for use in the invention as pump 11 of FIGS. 1–3. As shown in FIG. 4b, the liquid-ring pump contains rotor blades 21 within an outer housing 23. As shown in FIG. 4a, the liquid-ring pump contains two inlets 25 and 31, one for the stream to be pumped 14 (see FIGS. 1–3), and one for any service liquid 16 (see FIGS. 1–3) that might be required. The inlet stream containing liquid and vapors 14 is directed to the center portion of the pump. The service liquid stream 16 is rotated by the rotor blades and forms a ring because of centrifugal force. The rotor axis and body axis are offset, thus the liquid ring is not concentric with the rotor. The vapor is conveyed into the spaces between the rotor blades and the liquid ring, and as the rotor blades and liquid ring rotate, the vapor is compressed until it exits, with all of the liquid through one or more outlets 27 (see FIG. 4a). Any liquid which enters with the vapors will become a part of the liquid ring. If a sufficient amount of liquid is present in mixed liquid-vapor stream 14, it will not be necessary to employ any service liquid. The liquid-ring pump compresses the non-condensible hydrocarbon vapors to a pressure in the range of about 1–30 psig.

The mixed liquid-vapor outlet stream 18 (see FIGS. 1–3) can then be disposed of by means known to those of ordinary skill in the art, or can be subjected to further separation steps and the separated portions disposed of through waste streams and/or by incineration. In a preferred embodiment of this see FIGURES, the mixed stream 18 discharged from the liquid-ring pump 11 is passed to a separator 19 to separate the vapor portion 20 of stream 18 from the liquid portion 22 of stream 18. The vapor portion 20 is returned to the raw natural gas feedstream 2, thus eliminating the need to otherwise dispose of or incinerate the non-condensible hydrocarbon components and preventing the emission of such materials from the natural gas purifying process.

While this invention has been described in detail for the purposes of illustration, and has been disclosed in connection with the preferred embodiment thereof, the invention is not meant to be limited by such description. It should be understood that there may be other embodiments which fall within the scope and spirit of the invention as defined in the following claims.

That which is claimed:

1. A process for dehydrating a raw natural gas stream containing water and hydrocarbon components which comprises:

a) contacting said natural gas stream with an absorbent stream, wherein said absorbent stream absorbs substantially said water and a portion of said components from said gas stream;

b) separating the thus-dried gas stream from the thus-produced stream comprising absorbent water and hydrocarbon components;

c) separating said absorbent from said water and hydrocarbon components to provide a liquid absorbent steam and a vapor stream comprising water vapor and hydrocarbon vapor;

d) condensing said water vapor and a portion of said hydrocarbon vapor in said vapor stream, to provide a mixed liquid-vapor stream;

e) passing said mixed liquid-vapor stream through a liquid-ring pump capable of reducing the volume and increasing the pressure of said mixed stream; and f) thereafter passing said mixed stream through a separator to separate said vapor of said mixed stream from said liquid of said mixed stream and thereafter returning said vapor to said raw natural gas stream.

2. A process according to claim 1 wherein said absorbent is a glycol selected from the group consisting of ethylene glycol, diethylene glycol and triethylene glycol.

3. A process according to claim 2 wherein said separation step c) is accomplished using a glycol regenerator having a reboiler associated therewith.

4. A process according to claim 2 wherein step d) is accomplished using a heat exchanger with indirect heat exchange using a heat exchange medium.

5. A process according to claim 4 wherein said heat exchange medium is said glycol.

* * * * *

UNITED STATES PATENT AND TRADEMARK OFFICE
CERTIFICATE OF CORRECTION

PATENT NO.   : 5,788,745

DATED        : August 4, 1998

INVENTOR(S)  : Paul R. Hahn

It is certified that error appears in the above-identified patent and that said Letters Patent is hereby corrected as shown below:

Claim 1, column 4, line 33, after "absorbent" and before "water" insert --- , ---.

Claim 1, column 4, line 37, delete "steam" and insert --- stream --- therefor.

Signed and Sealed this

Twenty-ninth Day of September, 1998

Attest:

BRUCE LEHMAN

Attesting Officer      Commissioner of Patents and Trademarks